United States Patent [19]
Onishi et al.

[11] Patent Number: 6,019,866
[45] Date of Patent: Feb. 1, 2000

[54] THERMAL TRANSFER IMAGE RECORDING SHEET AND METHOD OF PRODUCING SAME

[75] Inventors: Toshikazu Onishi, Yokohama; Shigeo Hayashi, Kawasaki, both of Japan

[73] Assignee: Oji Paper Co., Ltd., Tokyo, Japan

[21] Appl. No.: 08/985,286

[22] Filed: Dec. 4, 1997

[30] Foreign Application Priority Data

Dec. 11, 1996 [JP] Japan ..................................... 8-330554

[51] Int. Cl.⁷ ........................... B41M 5/035; B41M 5/38; C09J 5/00
[52] U.S. Cl. ............................. 156/311; 503/227
[58] Field of Search ................................ 8/471; 428/195, 428/913, 914; 503/227; 156/311

[56] References Cited

U.S. PATENT DOCUMENTS

| | | | |
|---|---|---|---|
| 4,778,782 | 10/1988 | Ito et al. .................................. | 503/227 |
| 4,971,950 | 11/1990 | Kato et al. .............................. | 503/227 |
| 5,177,053 | 1/1993 | Nagura et al. .......................... | 503/227 |
| 5,244,861 | 9/1993 | Campbell et al. ...................... | 503/227 |
| 5,252,533 | 10/1993 | Yasuda et al. .......................... | 503/227 |
| 5,256,621 | 10/1993 | Yasuda et al. .......................... | 503/227 |
| 5,314,861 | 5/1994 | Morohoshi et al. .................... | 503/227 |

OTHER PUBLICATIONS

Abstract of Japanese Patent Publ. No. 02225087, dated Sep. 7, 1990.

*Primary Examiner*—Bruce H. Hess
*Attorney, Agent, or Firm*—Nikaido, Marmelstein, Murray & Oram LLP

[57] ABSTRACT

A method of producing a thermal transfer image recording sheet is provided including the steps (a) bonding a surface of a substrate sheet to a plastic film through a layer of a polymeric binder having a glass transition temperature of 50° C. or less to form a first laminate; (b) heat setting the first laminate under pressure at a temperature higher than the glass transition temperature of the polymeric binder layer to remove stress from the finished thermal transfer image recording sheet; and (c) forming a thermal transfer image-receiving layer on an exposed surface of the plastic film to produce the thermal transfer image recording sheet. A method of producing a thermal transfer image recording sheet is also provided including the steps (a) bonding a surface of a substrate sheet to a plastic film through a layer of a polymeric binder having a glass transition temperature of 50° C. or less to form a first laminate; (b) forming a thermal transfer image-receiving layer on an exposed surface of the plastic film to form a thermal transfer image recording sheet; and (c) heat setting the thermal transfer image recording sheet under pressure at a temperature higher than the glass transition temperature of the polymeric binder layer to remove remaining stress from the finished thermal transfer image recording sheet.

10 Claims, No Drawings

THERMAL TRANSFER IMAGE RECORDING SHEET AND METHOD OF PRODUCING SAME

BACKGROUND OF THE INVENTION (1) Field of the Invention

The present invention relates to a thermal transfer image recording sheet which will be referred to as an image recording sheet hereinafter. More particularly, the present invention relates to an image recording sheet having an enhanced resistance to curling.

(2) Description of the Related Art

It is known that the thermal transfer image recording systems are classified into thermal sublimating dye transfer systems in which a thermal sublimating dye is carried on a support sheet and is used in combination with a sublimating dye image-receiving sheet having a dye-receiving resin layer for recording dye images thereon, and dye images are transferred from the thermal transfer sheet to the sublimating dye-receiving sheet upon heating; and thermal ink melt transfer systems in which a thermal transfer sheet in which an ink comprising a thermally fusible substance, for example, a paraffin wax and a coloring pigment or dye is carried on a support sheet and is used in combination with an ink image-receiving sheet having an ink-receiving pigment and/or resin-containing layer, and the ink melt is transferred imagewise from the thermal transfer sheet to the ink receiving layer by heat-melting the ink. Both of the thermal transfer systems can record full colored images on the image receiving sheet.

Particularly, the thermal sublimating dye transfer system can produce clear full colored prints and has thus attracted public attention.

The thermal transfer sheet includes yellow, magenta and cyan-coloring dye sheets and optionally a black-coloring dye sheet. The full colored images are formed by arranging that each thermal transfer sheet is superposed on a dye image-receiving sheet and is heated imagewise by a thermal head attached to a printer so as to transfer the dye images from each thermal transfer sheet onto the image-receiving sheet. The transferred dye images are placed on other dye images so as to form the desired colored images.

In the case of the thermal sublimating dye transfer system, to obtain printed images with good quality, usually, an image-receiving sheet comprising a substrate sheet selected from monoaxially or biaxially orientated plastic resin films and multi-layered plastic resin films (namely, synthetic paper sheets), and an image-receiving layer formed on the substrate sheet and comprising, as a principal component, a sublimating dye-dyeable resin, is used. The above-mentioned dye image-receiving sheet is advantageous in that the thickness is even, the softness is satisfactory, the heat-conductivity is lower than that of conventional cellulose fiber paper sheets, and thus the transferred dye images having high color density and uniformity can be obtained.

In the production of the plastic film or the synthetic paper sheet, the films are oriented in one or two directions, and a residual orientation stress remains therein. Thus, when an image-receiving sheet comprising a plastic film and/or a synthetic paper sheet is subjected to a thermal transfer procedure, the residual stress in the plastic film and/or the synthetic paper sheet is released by heating so as to cause the plastic film and/or the synthetic paper sheet to shrink and thus curls or wrinkles are generated on the image-receiving sheet. The curls and wrinkles in the image-receiving sheet make it difficult to pass through the printer and the commercial value of the resultant prints significantly decreases.

To solve the problems derived from the materials for the substrate sheet, it has been attempted to laminate the above-mentioned monoaxially or biaxially oriented plastic films or synthetic paper sheets, on front and back surfaces of a core sheet, for example, a paper sheet, having a low thermal shrinkage or elongation, so as to balance the tensions created on the front and back surfaces of the resultant substrate sheet and to control the curling and/or wrinkling.

However, when the above-mentioned multi-layered substrate sheet is coated with an image-receiving layer to produce a thermal transfer image recording sheet, the plastic films or synthetic paper sheets in the substrate sheets thermally shrink and thus the resultant thermal transfer image recording sheet is curled or wrinkled and becomes commercially worthless. Namely, when a multi-layered substrate sheet is produced, the element sheets or films are usually bonded to each other through a polymeric binder by a dry laminating method. The polymeric binder for the dry lamination usually comprises a binder component selected from polyether and polyester binder compounds and a curing component selected from isocyanate and epoxy curing compounds and mixed with the binder component. The conventional polymeric binder is preferably selected from those having a glass transition temperature higher than 50° C., to enhance the bonding strength between the bonded element films or sheets. When the conventional multi-layered sheet is heated so as to cause element films or sheets to shrink at different rates from each other, the conventional cross-linked polymeric binder layer does not shrink and thus cannot absorb the shrinking energy of the element films or sheets. Accordingly, the conventional multi-layered sheet curls.

In view of the above-mentioned problems, there is a strong demand of a thermal transfer image recording sheet having an enhanced resistance to curling.

SUMMARY OF THE INVENTION

An object of the present invention is to provide a thermal transfer image-recording sheet having an enhanced resistance to curling and suitable for various types of thermal printers, especially not only dye thermal transfer printers, but also ink melt thermal transfer printers, and a method of producing the same.

The above-mentioned object can be attained by the thermal transfer image recording sheet, and the method of producing the same, of the present invention.

The thermal transfer image recording sheet of the present invention comprises a substrate sheet layer, a plastic film layer bonded to a surface of the substrate sheet layer through a polymeric binder and a thermal transfer image-receiving layer formed on the plastic film layer, said polymeric binder through which the substrate sheet layer and the plastic film layer are bonded to each other having a glass transition temperature of 50° C. or less.

The method of the present invention for producing the thermal transfer image recording sheet comprises the steps of bonding a surface of a substrate sheet to a plastic film through a polymeric binder and forming a thermal transfer image-receiving layer on the surface of the plastic film, said polymeric binder through which the substrate sheet and the plastic film are bonded to each other having a glass transition temperature of 50° C. or less.

DESCRIPTION OF THE PREFERRED EMBODIMENTS

In the thermal transfer image recording sheet of the present invention, the polymeric binder layer arranged between the substrate sheet layer and the plastic film layer and having a glass transition temperature of 50° C. or less significantly contributes to preventing the curling of the thermal transfer image recording sheet upon heating. Namely it was found, for the first time, by the inventors of the present invention that when the thermal transfer image recording sheet is heated imagewise, the polymeric binder layer having a glass transition temperature of 50° C. or less can shrink at adjacent portions thereof to the substrate sheet layer and to the plastic film layer in accordance with the shrinkages of the substrate sheet layer and the plastic film layer without peeling therefrom, and thus allow the substrate sheet layer and the plastic film layer to shrink independently from each other without curling or wrinkling, and thus prevent the curling of the thermal transfer image recording sheet.

Also, it was found by the inventors of the present invention that in the production of the image recording sheet, after the plastic film is bonded to the substrate sheet through the polymeric binder or after the image receiving layer formed on the plastic film layer is bonded to the substrate sheet layer through the polymeric binder, the resultant laminate can be heat set under pressure at a temperature higher than the glass transition temperature of the polymeric binder in a non-curled form.

Further it was found that when the image recording sheet is curled, the form of the image recording sheet can be corrected to a non-curled form by holding the curled image recording sheet in a non-curled flat form or in a bent form in a direction opposite to the curling direction, and heating under pressure the image recording sheet at a temperature higher than the glass transition temperature of the polymeric binder.

In the thermal transfer image recording sheet of the present invention, the occurrence of curling is prevented by the specific polymeric binder layer having a glass transition temperature of 50° C. or less, preferably 50° C. or less but not less than 0° C., and arranged between the substrate sheet layer and the plastic film layer bonded therethrough.

The polymeric binder is not limited to specific type of binders as long as the binder has a glass transition temperature of 50° C. or less. Preferably, the polymeric binder comprises, as a principal component, at least one member selected from styrene-butadiene copolymers, polybutadienes, polychloroprenes, acrylate ester copolymers, vinylether copolymers, ethylene-vinyl acetate copolymers, polyurethane resins, and silicone resins. The polymeric binder optionally contains, as an additive, at least one member selected from tackifying resins, plasticizers, for example, phthalate esters, phosphate esters, and chlorinated paraffins, cross-linking agents, for example, polyisocyanates, metal chelating compounds, and epoxy compounds, antiaging agents, and stabilizers. Even when the polymeric binder contains an additive, the resultant polymeric binder layer must exhibit a glass transition temperature of 50° C. or less.

In the polymeric binder layer of the present invention, the lower the glass transition temperature thereof, the higher the curl-preventing effect thereof. To enhance the bonding strength, it is preferable that the glass transition temperature be 50° C. or less but not less than 0° C. If the glass transition temperature is more than 50° C., the resultant polymeric binder layer cannot allow the substrate sheet layer and the plastic film layer to shrink without curling or wrinkling.

The polymeric binder layer can be formed by a conventional laminating method, for example, dry laminate, hot melt laminate, wet laminate, extrusion laminate, or wax laminate method. The polymeric binder layer is preferably formed in an amount of 1.0 to 50.0 g/m².

The thermal transfer image recording sheet comprises a substrate sheet layer, a plastic film layer bonded to a front surface of the substrate sheet layer through a plastic binder layer and a thermal transfer image receiving layer formed on the plastic film layer. In the method of the present invention, a plastic film is bonded to a front surface of a substrate sheet through a polymeric binder layer. Preferably, a back surface of the substrate sheet is coated by a plastic film through a polymeric binder layer. In this case, the polymeric binder layer for the back plastic film layer preferably has a glass transition temperature of 50° C. or less.

The plastic film layer bonded to the front surface of the substrate sheet layer is coated with a thermal transfer image-receiving layer comprising, as a principal component, a dye or ink melt-receiving resin.

In the image recording sheet of the present invention, a back coating layer is optionally coated on the back surface of the substrate sheet layer or the back plastic film layer bonded to the back surface of the substrate sheet layer. Alternatively, the back film layer may be coated with a back thermal transfer image receiving layer comprising, as a principal component, a dye or ink melt-receiving resin. The individual layers will be further explained in detail below.

The plastic film layer to be laminated on the front surface of the substrate sheet layer is preferably formed from at least one member selected from orientated films of polyolefins, for example, polyethylenes and polypropylenes, polyesters, for example, polyethylene terephthalate, polyamides, for example, nylon 6 and nylon 66, polyvinyl chloride, and polystyrene and multi-layered thermoplastic films, for example, multi-layered polyolefin films. Preferably, the plastic film layer has a thickness of 5 to 200 μm, more preferably 10 to 120 μm.

The substrate sheet layer is preferably formed from at least one member selected from the group consisting of paper sheets, pigment-coated paper sheets, art paper sheets, cast-coated paper sheets, thermoplastic resin-laminated paper sheets, and synthetic resin films and sheets comprising, for example, at least one member selected from the group consisting of polyesters, polyamides, polyolefins, polystyrene, polycarbonates, polyvinyl alcohol and polyvinyl chloride.

The substrate sheet layer preferably has a thickness of 20 to 300 μm, more preferably 50 to 250 μm. When the thickness is less than 20 μm, the resultant image-recording sheet may have an unsatisfactory mechanical strength, an insufficient stiffness and an insufficient recovery from deformation and thus exhibit an unsatisfactory resistance to curling occurring during thermal transfer printing procedure. Also, if the thickness is more than 300 μm, the resultant image recording sheet is too thick. Namely, since the printer has a limited capacity for containing the recording sheets, the increase in thickness of the individual sheets results in decrease in the number of the sheets which can be contained in the printer. If it is desired to contain the thickness-increased sheets in a non-decreased number in the printer, the sheet chamber of the printer must be enlarged, and thus the size of the printer must be enlarged. An enlarged printer is not preferable in practice.

The image-receiving layer can receive a dye or ink melt transferred imagewise from the thermal transfer dye or ink sheet. The sublimating dye-receiving layer comprises a sublimating dye-dyeable resin and optionally a cross-linking agent, a fuse cohesion-preventing agent, and/or an ultraviolet ray-absorber. The sublimating dye-dyeable resin is preferably selected from, for example, cellulose acetate butylate resins and polyester resins. The cross-linking agents include isocyanate compounds and epoxy compounds, the ultraviolet ray-absorbers include benzotriazole compounds, benzophenone compounds, phenylsalicylate compounds and cyanoacrylate compounds, and the fuse cohesion-preventing resins include acrylic silicone resins, lubricants, for example, polyethylene waxes, paraffin waxes and higher fatty acid esters, and release agents, for example, silicone oils, phosphate ester surfactants and fluorine-containing surfactants. The dyeable resins and other components are preferably capable of being cross-linked with the cross-linking agents.

The ink melt receiving layer preferably comprises polymeric materials compatible with the ink melt, for example, acrylic resins and polyolefin resins, and optionally, inorganic and organic fillers.

The image-receiving layer is preferably in an amount of 0.1 to 20.0 g/m$^2$, more preferably 3 to 12 g/m$^2$. The back coating layer is formed on the back surface of the substrate sheet layer for the purpose of enhancing the travelling property through the printer and the anti-static property of the image recording sheet, for preventing damage to the image-receiving layer due to an abrasive contact with the back surface of an adjacent sheet, and of preventing, when printed sheets are superposed on each other, the migration of dye or ink from the image-receiving layer to the back surface of the adjacent sheet. The back coating layer comprises a polymeric material which can form a film, can be adhered to the substrate sheet layer and contributes to enhancing the forwarding property of the sheets through the printer and to preventing the damage to the image receiving layer. The polymeric material for the back coating layer preferably comprises at least one member selected from, for example, acrylic resins, epoxy resins, polyester resins, phenol resins, alkyd resins, urethane resins, melamine resins and curing products of the above-mentioned resins.

The back coating layer optionally contains an electroconductive agent for the purpose of enhancing the anti-static property of the image recording sheets. The electroconductive agent for the image recording sheets is preferably selected from cationic polymeric materials. Generally, the cationic polymeric materials include cation-modified acrylamide polymeric materials and cationic starches. The back coating layer is preferably in an amount of 0.3 to 10 g/m$^2$, more preferably 0.5 to 3 g/m$^2$. When the amount of the back coating layer is less than 0.3 g/m$^2$, the damage-preventing effect of the resultant back coating layer for the image-receiving layer may be insufficient. Also, when the back coating layer amount is more than 10 g/m$^2$, the effects of the back coating layer may be saturated and an economic disadvantage may occur.

The image receiving layer or the back coating layer can be formed by coating a coating liquid by using a conventional coating means, for example, a blade coater, air knife coater or gate roll coater, and drying the coating liquid layer.

EXAMPLES

The present invention will be further explained in detail by the following examples which are merely representative and are not intended to restrict the scope of the present invention in any way.

In each of the examples and comparative examples, the image receiving layer and the back coating layer were formed from the coating liquids having the following compositions, respectively.

| Coating liquid for image receiving layer | |
|---|---|
| Component | Parts by weight |
| Polyester resin (*)$_1$ | 100 |
| Silicone oil (*)$_2$ | 3 |
| Isocyanate compound (*)$_3$ | 5 |
| Toluene | 300 |

[Note]
(*)$_1$ Trademark: Vylon 200, made by Toyobo
(*)$_2$ Trademark: Silicone Oil KF393, made by Shinetsu Silicone K.K.
(*)$_3$ Trademark: Takenate D-140N, made by Takeda Yakuhin K.K.

| Coating liquid for back coating layer | |
|---|---|
| Component | Parts by weight |
| Acrylate ester copolymer (*)$_4$ | 100 |
| Epoxy resin (*)$_5$ | 5 |
| Electrocondutive agent (*)$_6$ | 50 |
| Modified Ethanol | 1420 |

[Note]
(*)$_4$ Trademark: Primal WL-81, made by Rohm & Haas Co.
(*)$_5$ Trademark: Epocoat DX-225, made by Shell Kagaku K.K.
(*)$_6$ Trademark: Saftmer ST 1000, made by Mitsubishi Yuka K.K.

Example 1

A polyurethane resin binder (trademark: AD-593, made by Toyo Morton K.K.) was coated at a thickness of 5 μm on a front surface of a wood free paper sheet having a thickness of 100 μm. Then, on the polymeric binder layer, a biaxially orientated multi-layered plastic film comprising a polyolefin resin, as a principal component, and about 30% by weight of an inorganic pigment consisting of calcium carbonate and having a thickness of 60 μm (trademark: Yupo FPG60, made by Oji Yukagoseishi K.K.) was laminated by a dry laminate method under a controlled tension so that no curl is generated. The polymeric binder layer had a glass transition temperature of 10° C.

The front surface of the plastic film layer of the resultant laminate was coated with the above-mentioned coating liquid for image receiving layer and dried at a temperature of 120° C. for one minute, to form an image receiving layer in a dry amount of 8 g/m$^2$. Then, the coating liquid for the back coating layer was coated on the back surface of the paper sheet layer of the laminate and dried at a temperature of 120° C. for one minute to form a back coating layer in a dry amount of 1 g/m$^2$. A thermal transfer image recording sheet was obtained.

The curling degree of the image recording sheet was measured in the following manner.

The image recording sheet was cut into an A5 size specimen, and the specimen was placed on a horizontal smooth surface under conditions of 20° C. and 65% RH for 24 hours, and heights of ends of specimen's four corners bent upward from the horizontal smooth surface were measured and an average value of the measured height values was calculated. The curling degree of the sheet was represented by the average curling height.

In the measurement result, the curling degree of the image recording sheet was 45 mm.

The image recording sheet was interposed between two plane horizontal glass plates each having an A5 size and a weight of 1 kg and left to stand at a temperature of 50° C. for 24 hours. The resultant image recording sheet had a curling degree of 5 mm.

When the curling degree is more than 5 mm, the image recording sheets cause the feed and delivery of the sheets through the printer to be blocked and have a poor commercial value.

Example 2

A polyurethane resin binder (trademark: AD-593, made by Toyo Morton K.K.) was coated at a thickness of 5 μm on a front surface of a wood free paper sheet having a thickness 100 μm. Then, on the polymeric binder layer, a biaxially orientated multi-layered plastic film comprising a polyolefin resin, as a principal component, and about 30% by weight of calcium carbonate and having a thickness of 60 μm (trademark: Yupo FPG60, made by Oji Yukagoseishi K.K.) was laminated by a dry laminate method under a controlled tension so that no curl is generated. The polymeric binder layer had a glass transition temperature of 10° C.

On the back surface of the paper sheet layer (thickness: 100 μm) of the laminate, a biaxially orientated, multi-layered plastic film comprising a polyolefin resin as a principal component and about 30% by weight of an inorganic pigment consisting of calcium carbonate and having a thickness of 60 μm (trademark: Yupo FPG60, made by Oji Yukagoseishi K.K.) was laminated.

On the front surface of the resultant laminate, the coating liquid for the image receiving layer was coated in the same manner as in Example 1. A thermal transfer image recording sheet was obtained.

The image recording sheet exhibited a curling degree of 5 mm.

The image recording sheet was interposed between two horizontal plane glass plate and left to stand at a temperature of 50° C. for 24 hours in the same manner as in Example 1. The resultant image recording sheet exhibited a curling degree of 2 mm.

Example 3

A thermal transfer image recording sheet was produced by the same procedures as in Example 2 with the following exceptions.

As a polymeric binder, an acrylic resin emulsion adhesive (trademark: Nikkasol L-145, made by Nihon Carbide Kogyo K.K.) was employed in place of the polyurethane resin binder. The resultant polymeric binder layer exhibited a glass transition temperature of −50° C.

The resultant image recording sheet exhibited a curling degree of 5 mm.

After heat setting the image recording sheet by interposing between two horizontal plane glass plates and heating at a temperature of 50° C. for 24 hours, the image recording sheet exhibited a curling degree of 0 mm.

Comparative Example 1

A polymeric binder comprising a polyurethane resin binder (trademark: AD-593, made by Toyo Morton K.K.) and a polyisocyanate curing agent (trademark: CAT-56, made by Toyo Morton K.K.) in a solid weight ratio of 1:0.2, was coated at a thickness of 5 μm on a front surface of a wood free paper sheet having a thickness of 100 μm. Then, on the resultant polymeric binder layer, a biaxially orientated, multi-layered plastic film (trademark: Yupo FPG60, made by Oji Yukagoseishi K.K.) comprising a polyolefin resin as a principal component and about 30% by weight of an inorganic pigment consisting of calcium carbonate and having a thickness of 60 μm was laminated by a dry laminate method under a tension controlled to an extent such that no curl is generated.

Then, the back surface of the substrate paper sheet (thickness: 100 μm) of the resultant laminate was laminated with a biaxially orientated, multi-layered plastic film (trademark: Yupo FPG60, made by Oji Yukagoseishi K.K.) comprising a polyolefin resin as a principal component and about 30% by weight of an inorganic pigment consisting of calcium carbonate and having a thickness of 60 μm in the same manner as mentioned above. The resultant laminate was heated at a temperature of 40° C. for 48 hours to cross-link the polymeric binder layer. The cross-linked polymeric binder layer exhibited a glass transition temperature of 80° C.

The coating liquid for the image receiving layer was coated on the front surface of the plastic film layer of the laminate in the same manner as in Example 2, to produce a thermal transfer image recording sheet. The image recording sheet exhibited a curling degree of 20 mm. The image recording sheet was interposed between two horizontal plane glass plates and heated at a temperature of 50° C. for 24 hours. The heat-set image recording sheet exhibited the same curling degree of 20 mm as that of the non-heat set sheet.

Comparative Example 2

A thermal transfer image recording sheet was produced by the same procedures as in Example 2, except that the polymeric binder layer was formed from an acrylic resin binder (trademark: RX-969B, made by Nihon Carbide Kogyo K.K.), and the resultant polymeric binder layer exhibited a glass transition temperature of 54° C.

The resultant image recording sheet exhibited a curling degree of 16 mm.

The image recording sheet was interposed between two horizontal plane glass plates and heat-set at a temperature of 50° C. for 24 hours. The resultant sheet exhibited a curling degree of 12 mm which was unsatisfactory.

The curling test results of the examples and the comparative examples are shown in Table 1.

TABLE 1

| | | Item | | |
|---|---|---|---|---|
| Examples | | Glass transition temperature of polymeric binder layer (° C.) | Curling degree of non-heat set image recording sheet (mm) | Curling degree of heat set image recording sheet of 50° C. for 24 hours (mm) |
| Example | 1 | 10 | 45 | 5 |
| | 2 | 10 | 5 | 2 |
| | 3 | −50 | 5 | 0 |
| Comparative | 1 | 80 | 20 | 20 |
| Example | 2 | 54 | 16 | 12 |

Table 1 clearly shows that in each of Examples 1 to 3, the polymeric binder layer has a glass transition temperature of 50° C. or less, and thus the curling degree can be decreased by heat-setting under a condition of the glass transition temperature or more of the polymeric binder layer. This advantage is considered to be derived from the phenomenon that the polymeric binder layer having a low glass transition temperature and arranged between the substrate sheet layer and the plastic film layer can shrink to accommodate the thermal shrinkages of the substrate sheet layer and the plastic film layer. Therefore, the specific polymeric binder layer of the present invention significantly contributes to enhance the resistance of the resultant image recording sheet to curling and wrinkling.

In each of the comparative examples, the polymeric binder layer having a high glass transition temperature cannot prevent the curling of the image recording sheet due to the shrinkage of the plastic film layer and the substrate sheet layer.

The thermal transfer image recording sheet of the present invention having a high resistance to curling is useful for various types of thermal transfer full color printing systems, for example, sublimating dye-thermal transfer full color printing systems and ink melt-thermal transfer full color printing systems.

We claim:

1. A method of producing a thermal transfer image recording sheet comprising the steps:
   (a) bonding a surface of a substrate sheet to a plastic film through a layer of a polymeric binder having a glass transition temperature of 50° C. or less to form a first laminate;
   (b) heat setting the first laminate under pressure at a temperature higher than the glass transition temperature of the polymeric binder layer to remove stress from the finished thermal transfer image recording sheet; and
   (c) forming a thermal transfer image-receiving layer on an exposed surface of the plastic film to produce the thermal transfer image recording sheet.

2. The method as claimed in claim 1, wherein the polymeric binder layer comprises at least one member selected from the group consisting of styrene-butadiene copolymers, polybutadienes, polychloroprenes, acrylate ester copolymers, vinylether copolymers, ethylene-vinyl acetate copolymers, polyurethanes, and silicone resins, each having a glass transition temperature of 50° C. or less.

3. The method as claimed in claim 1, wherein the glass transition temperature of the polymeric binder layer is not less than 0° C.

4. The method as claimed in claim 1, wherein the substrate sheet layer comprises at least one member selected from the group consisting of paper sheets, pigment-coated paper sheets, art paper sheets, cast-coated paper sheets, thermoplastic resin-laminated paper sheets, and synthetic resin films and sheets.

5. The method as claimed in claim 1, wherein the plastic film layer comprises at least one member selected from the group consisting of orientated films of polyolefins, polyesters, polyamides, polyvinyl chloride and polystyrene and multi-layered thermoplastic films.

6. A method of producing a thermal transfer image recording sheet comprising the steps:
   (a) bonding a surface of a substrate sheet to a plastic film through a layer of a polymeric binder having a glass transition temperature of 50° C. or less to form a first laminate;
   (b) forming a thermal transfer image-receiving layer on an exposed surface of the plastic film to form a thermal transfer image recording sheet; and
   (c) heat setting the thermal transfer image recording sheet under pressure at a temperature higher than the glass transition temperature of the polymeric binder layer to remove remaining stress from the finished thermal transfer image recording sheet.

7. The method as claimed in claim 6, wherein the polymeric binder layer comprises at least one member selected from the group consisting of styrene-butadiene copolymers, polybutadienes, polychloroprenes, acrylate ester copolymers, vinylether copolymers, ethylene-vinyl acetate copolymers, polyurethanes, and silicone resins, each having a glass transition temperature of 50° C. or less.

8. The method as claimed in claim 6, wherein the glass transition temperature of the polymeric binder layer is not less than 0° C.

9. The method as claimed in claim 6, wherein the substrate sheet layer comprises at least one member selected from the group consisting of paper sheets, pigment-coated paper sheets, art paper sheets, cast-coated paper sheets, thermoplastic resin-laminated paper sheets, and synthetic resin films and sheets.

10. The method as claimed in claim 6, wherein the plastic film layer comprises at least one member selected from the group consisting of orientated films of polyolefins, polyesters, polyamides, polyvinyl chloride and polystyrene and multi-layered thermoplastic films.

* * * * *